July 6, 1926.

R. B. BROWNE

MOLDING MACHINE

Filed July 1, 1925

INVENTOR
R. B. BROWNE
BY
Fenelon B. Brock
ATTORNEY

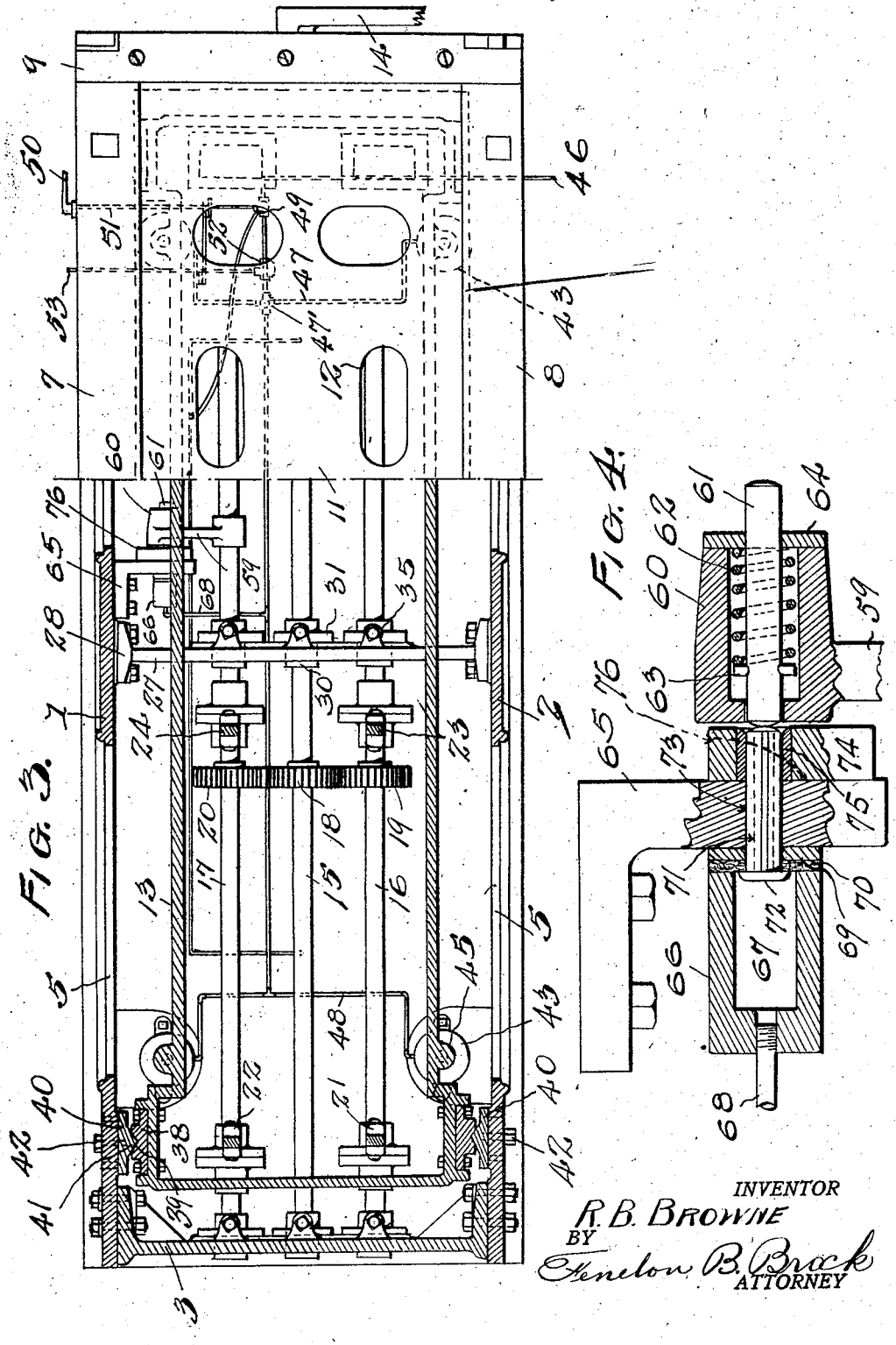

July 6, 1926.
R. B. BROWNE
1,591,013
MOLDING MACHINE
Filed July 1, 1925
4 Sheets-Sheet 3
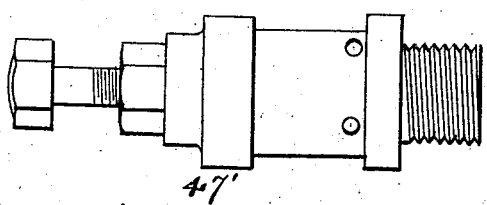
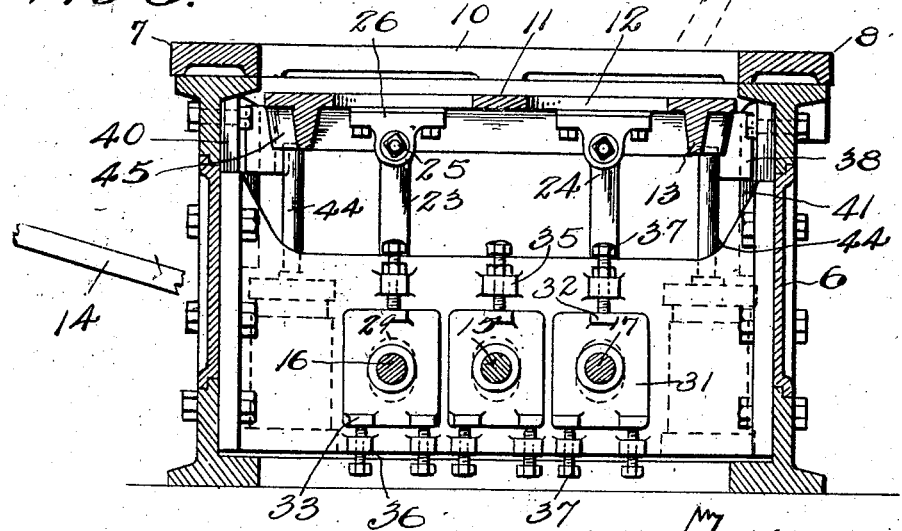
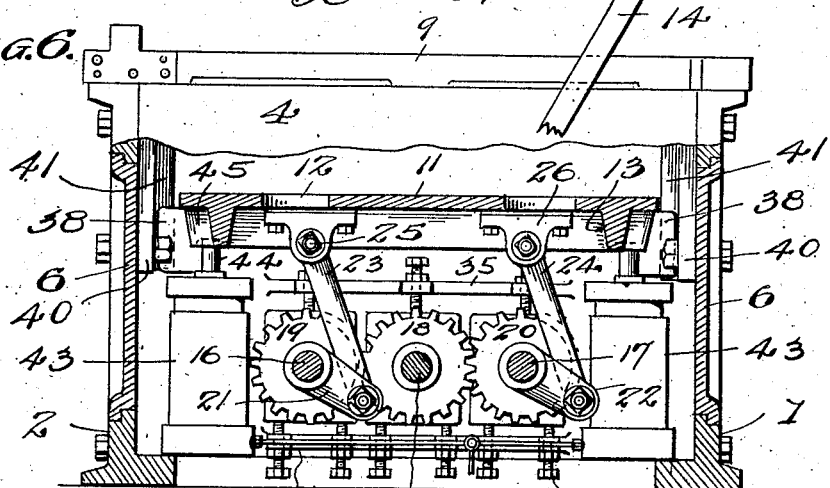
INVENTOR
R. B. BROWNE
BY
Fenelon B. Brock
ATTORNEY

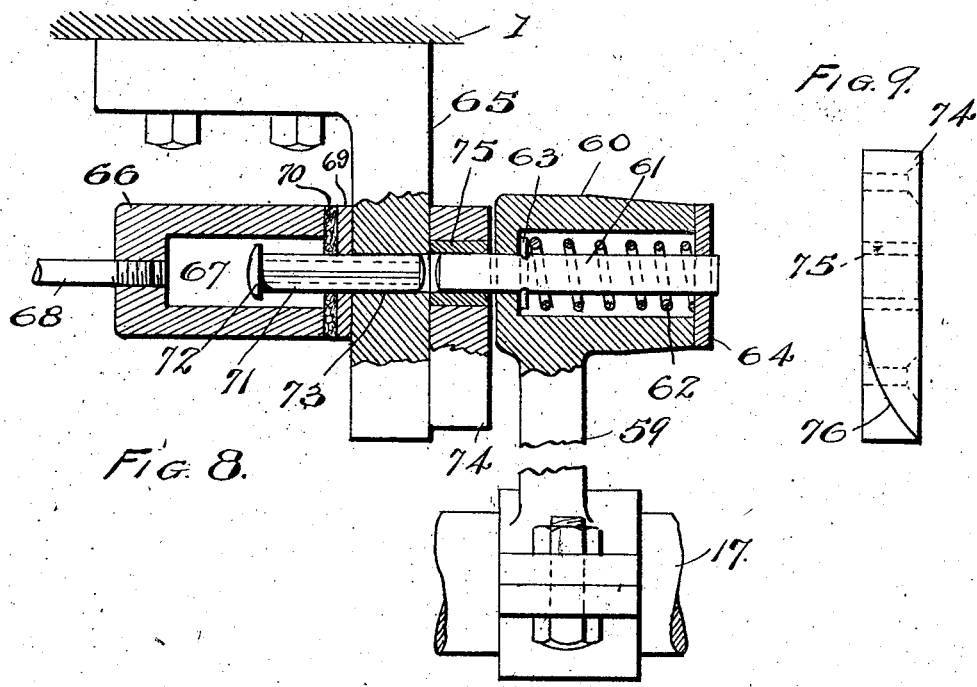
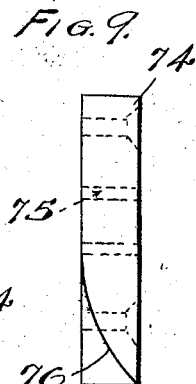
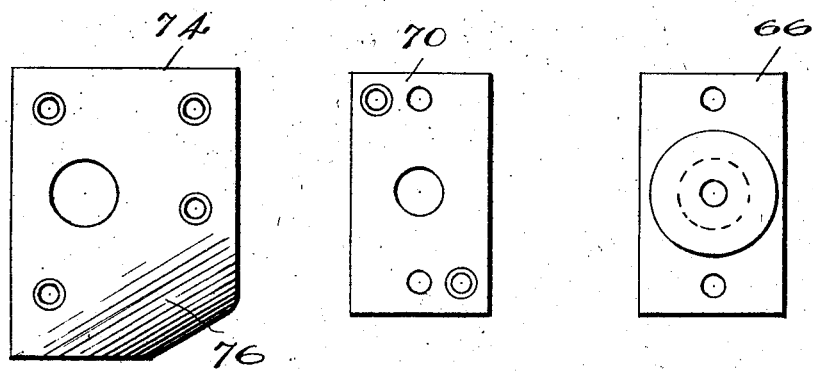

Patented July 6, 1926.

1,591,013

UNITED STATES PATENT OFFICE.

RICHARD B. BROWNE, OF BROOKLYN, NEW YORK, ASSIGNOR TO RICHEY, BROWNE & DONALD, INCORPORATED, OF MASPETH, NEW YORK.

MOLDING MACHINE.

Application filed July 1, 1925. Serial No. 40,878.

The improved molding machine of the invention is adapted especially for use in the manufacture of large work, such as doors, frames, risers, treads and numerous other architectural machine and other castings. In connection with the molding machine patterns of wood, metal or other suitable material may be used. The machine is of that type in which manually operated means are employed for vertically reciprocating the horizontal draw plate and pattern plate, and motive fluid means, as pneumatic pumps, are utilized for balancing and cushioning the weight of the draw plate to facilitate its manual operation. Means are also utilized for automatically relieving the motive fluid or air pressure, and in connection with the air pressure mechanism I also employ an automatic safety lock to prevent accidental descent or falling of the draw plate. These and other meritorious features of the invention will be more specifically set forth in the following specification and claims and are illustrated in the accompanying drawings.

The accompanying drawings illustrate one complete example of the physical embodiment of the invention wherein the parts are combined and arranged according to one mode thus far devised for the practical application of the principles of the invention.

Figure 3 is a view of the machine showing one end in plan and the other end portion of the machine in horizontal section, with the draw plate removed.

Figure 4 is an enlarged detail view showing in section the safety device or air lock.

Figure 5 is a transverse vertical sectional view of the machine showing the draw plate elevated.

Figure 6 is a transverse vertical sectional view of the machine with the draw plate in lowered position.

Figure 7 is a view showing an adjustable relief valve device for the air line.

Figure 8 is a sectional view similar to Figure 4 showing the safety device in locked position.

Figure 9 is an edge view of the strike plate of the safety device.

Figure 10 is a face view of the strike plate.

Figure 11 is a face view of a cover plate of the safety device.

Figure 12 is a face view of the bronze casting forming the air chamber of the air lock or safety device.

Figure 1:
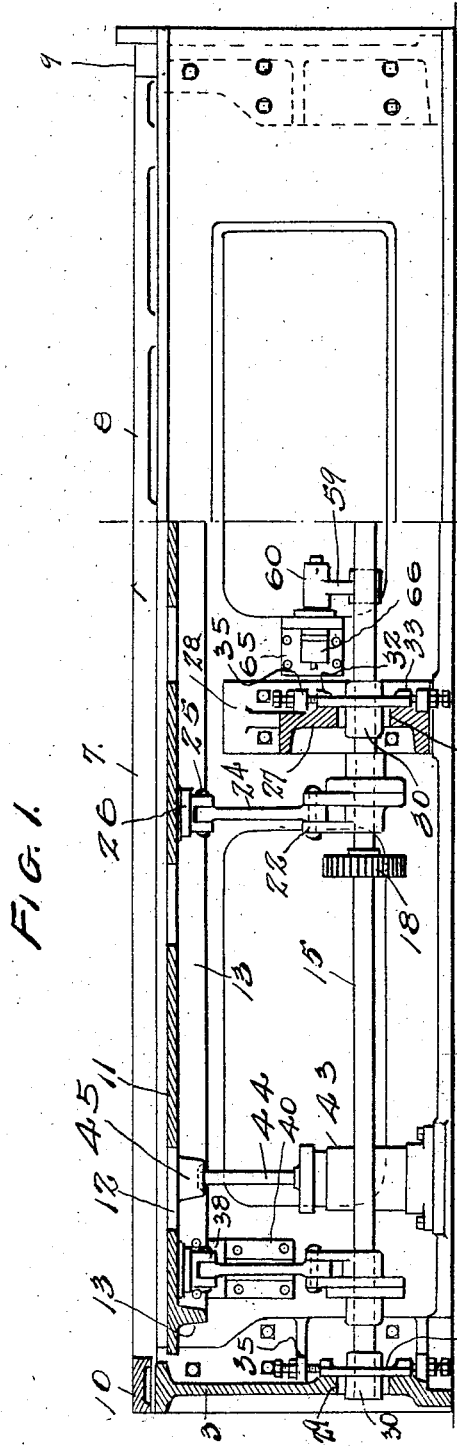
Figure 1 is a view partly in side elevation and partly in section for convenience of illustration of a machine embodying the invention.

In carrying out the invention a rectangular machine body or frame is preferably used comprising substantial cast iron sides 1 and 2 and ends 3 and 4 in which port holes 5 are provided for access to the interior of the machine body when the plates 6 are removed.

The pattern board (not shown) is located between the stripping plate members which comprise side bars 7 and 8 and end bars 9 and 10 positioned on the upper or top edge of the flanged rectangular frame.

The horizontally disposed draw plate 11 which is bored at suitable locations to receive bolts of the pattern plate, is vertically reciprocable within the machine frame, and is fashioned with usual openings 12 spaced and arranged at desired intervals, and at its under side said plate is provided with a vertical flange or web 13 of substantially rectangular shape and inset from the edges of the plate.

The reciprocable draw plate is manually operated and is guided by mechanical means and pneumatic pressure is employed for balancing and cushioning the movement of the plate. The guide and balancing devices are disposed at the four corners of the plate to insure a stable reciprocable movement of the machine.

For manually operating the draw plate a single lever 14 is employed and located at one end of the machine. This lever is affixed on a central, longitudinally disposed actuating shaft 15 located near the base of the machine and positioned between a pair of parallel operating shafts 16 and 17.

These three shafts are operatively connected by gears or pinions 18, 19 and 20 on the respective shafts, and the throw of the lever 14 from dotted position to full line position of Figure 5 rocks these shafts and turns the gears for elevating the draw plate from low position in Figure 6 to elevated position in Figure 5. When used in wider machines the number of shafts may be increased, while in smaller or narrower machines the number of shafts may be decreased.

The two operating shafts 16 and 17 are provided with sets of crank arms 21 and 22 and these arms are pivotally connected by links or pitmen 23, 24 and 25 to bearing plates 26 which are bolted at the under side of the draw plate for transmitting the rotary power of the shafts to the reciprocating movement of the plate as developed by the strokes of the lever 14.

The three shafts are provided with adjustable end and intermediate journal bearings, by means of which the throw of the pitmen may be regulated and the movement of the draw plate varied for accommodating the machine to adjust irregularities.

The two end plates 3 and 4 and an intermediate, vertical plate or partition 27 are utilized to support the adjustable journal bearings. The plate 27 is provided with end attaching flanges 28 that are bolted at the insides of the side plates 1 and 2, and both the end plates and the intermediate plate are fashioned with vertically arranged bearing slots 29 for the three shafts. In each of the slots 29 is arranged a bearing bushing 30 for a shaft, and the bushing is fashioned with a rectangular bearing plate 31 arranged in close proximity to the machine plates. These bearing plates are each fashioned with an upper central lug 32, and a pair of spaced lower lugs 33 that project laterally from the plate. The end plates 3 and 4 and the intermediate plate 27 of the machine are fashioned with complementary lugs or flanges 35 above the bearing plates and also with a pair of lugs or flanges 36 below these bearing plates. Adjusting bolts 37 are employed in the machine-plate lugs to engage the upper and lower faces of the two sets of bearing-plate lugs, and it will be apparent that by turning the bolts the several bearing plates may be adjusted uniformly and with facility to true the three shafts and bring them to the desired relative positions.

For guiding and insuring a stable movement of the reciprocable draw plate means are employed at the four corners of the machine comprising co-acting stationary guided end guides movable with the draw plate. At each end of the draw plate and on opposite sides of the flange or web 13 are bolted vertically disposed guide plates 38 having grooves or ways 39, and complementary, adjustable plates 40 each having a vertical rib 41, co-act with the guides of the draw plate. The stationary plates 40 are attached at the inner sides of the two side plates 1 and 2 of the machine frame, and they may be adjusted as by bolts 42 to compensate for wear as well as to vary the frictional engagement of the pairs of plates. By this means the draw plate may be accurately trued up to a stable and guided movement and maintained at all times in that condition.

The weight or the load of the reciprocable draw plate is counterbalanced and its movements are cushioned by counterbalancing means, as pneumatic pumps, to facilitate the manual operation of the plate, and a system of air pipes is employed with the body of the machine to supply a constant air pressure for the pumps and vibrators (not shown). In the drawings four air pumps 43 are indicated by their cylinders, one located at each corner of the machine and properly supported within the body or frame. The pumps are of the reciprocable type having pistons (not shown) and a piston stem 44 or plunger bar, which has a loose bearing at its upper end in a boss 45 cast integral with the flange or web 13 of the draw plate.

An air line to supply air pressure to the pumps includes the main air supply pipe 46 which enters the machine at one side thereof and extends longitudinally therein near the base portion, clear of the operating parts of the machine. Near the ends of the machine branch pipes 47 and 48 are connected with the main pipe to supply a normally constant pressure of air to the cylinders of the pumps below their pistons, and a relief valve, as indicated in Figure 7 as 47' is used in the air line for adjusting the escape of air when required. A two-way control valve 49 is also located in the main pipe and provided with a regulating handle 50 and shaft 51 which extends outside of the machine for ready access to the handle. An adjustable relief valve 52 is located in the main pipe and may be manipulated by means of the shaft 53.

Figure 2:
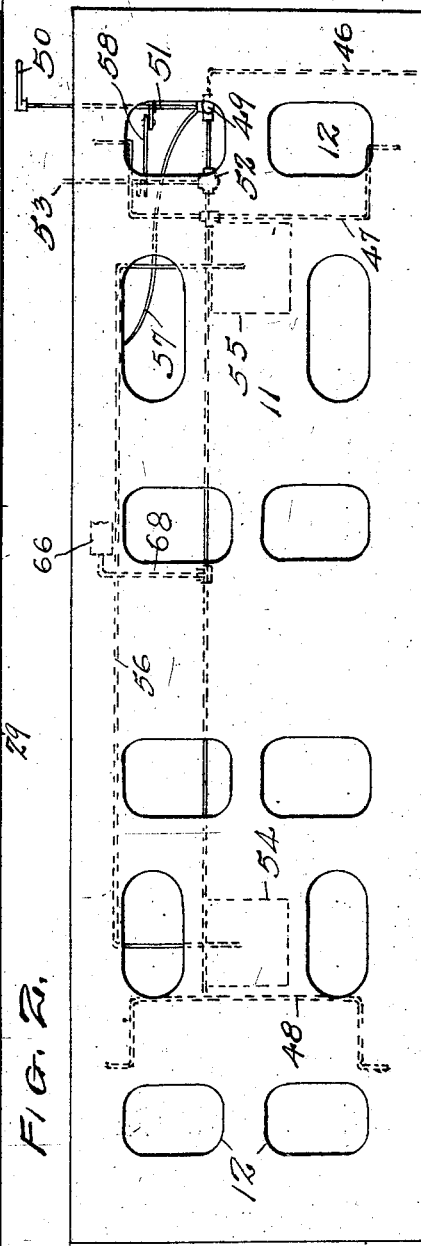
Figure 2 is a diagrammatic view showing the top of a draw plate, and air line connections.

By dotted lines in Figure 2 two pads 54 and 55, which indicate the positions of the vibrators, are shown, and the vibrators (not shown) are pneumatically actuated by air pressure in the pipe line 56 which is connected to a two-way valve 49, by a hose connection indicated at 57. By turning the crank 50 to proper position the passage of air is regulated to hose 57 and thence through pipe 56 for operating the vibrators.

When the draw plate is lowered, the crank 50 which controls the vibrators also opens the adjustable relief valve 52 by means of the link connection 58 between the shafts 51 and 53 to permit slight escape of air from the counterbalancing pumps, thus relieving air pressure in the pumps with consequent facility in lowering the draw plate, with normal expenditure of manual power.

Under normal conditions the pressure of air in the pipe line 46 is constant during working hours, but should the pressure accidentally be withdrawn or turned off while the machine is in operation with the draw plate in elevated position, an automatic safety device becomes operative for locking the plate in its elevated position to prevent accidental descent with consequent danger to person or material. The plate is thus prevented from falling should the pressure below the piston be relieved accidentally, and danger to the operator from the swinging of the lever 14 is eliminated.

This air lock or safety device is normally inoperative while air pressure is on but becomes operative while the plate is elevated, when the air pressure is withdrawn.

For this purpose one of the shafts as 17 is provided with an arm 59 fixed to swing with the oscillating shaft and this arm swings upwardly as the draw plate is elevated. At its free end the arm has a rigid hollow head 60 in which a slide bolt 61 is carried, and by means of a spring 62 coiled about the bolt and interposed between a cross pin 63 of the bolt and the cover plate 64 at the end of the hollow head, the bolt is pressed toward the left in Figure 4 as indicated. At a suitable location in the path of movement of the bolt at the end of its up-stroke an air valve device is located. This device is attached by an angle bracket 65 to a side plate as 1 of the machine and includes a bronze casing 66 secured to the bracket and provided with an interior pressure chamber 67, which chamber normally receives air pressure through pipe 68 from the air pipe 46.

A metal cover plate 69 and leather gasket 70 are interposed between the casting of the pressure chamber and the bracket, and escape of air is prevented from the pressure chamber by means of a slidable plunger 71 having its head 72 located in the chamber to close a bore 73 in the bracket, cover plate and gasket. With pressure in the chamber 67 from the air line the plunger is held in normal position as indicated in Figure 4. A strike plate 74 is bolted to the bracket at its side opposite to the pressure chamber and a bushing 75 is fixed therein for the plunger to slide in.

The strike plate is fashioned with a cam or bevel face 76 located in the path of movements of the spring pressed, projected bolt 61, and as the bolt strikes this face and rides upon it the bolt is retracted to position shown in Figure 4. If as indicated in Figure 4 the machine is operating under normal pressure with the plunger 71 held under pressure of air, the bolt does not become operative to lock the plate. If, however, pressure is absent from the chamber 67, the spring pressed bolt will be forced into the bushing 75, ejecting the plunger, and locking the plate and shaft 17 against relative movement. Under these conditions the draw plate is locked in elevated position and cannot be moved until air pressure is again restored whereupon the plunger 71 will eject the slide bolt and release the shaft 17 to turn.

The draw plate 11 is raised or elevated to position of Figure 1 by the operator who manipulates the lever 14 and swings it downwardly to horizontal position (full lines) from the dotted line position of Figure 5. The flask (not shown) is then placed in its proper position on top of the machine, filled with sand, tamped and rolled. The draw plate with its pattern attached is lowered from the mold by actuating the crank 50 at the side of the machine to release a small quantity of air from the pumps thus reducing the pressure therein to permit easy lowering of the draw plate by use of the manual lever 14. After the draw plate is lowered the flask with the mold are removed from the machine to its proper position and the draw plate is again elevated and the operation repeated.

The draw plate is held in its normal elevated position and prevented from falling by action of gravity, by the use of the safety device or air lock, in the event that the air is accidentally turned off, or by a break in the air line. Such an accident would permit the draw plate to drop and in so doing the lever 14 would be swung upwardly with sufficient force as to injure anyone in its path. When the draw plate is lowered the arm 59 with its plunger 61 swings away from the strike plate and the plunger is then projected by the action of the spring 62. When the draw plate is elevated, on the return movement of the arm, the projected plunger contacts with and rides over the cam face 76 of the strike plate, and this frictional contact of the plunger with the cam face forces the plunger back into its retracted position in the housing 60. The plunger is thus again in position to be projected by spring pressure when the air pressure is released in the chamber 67, and the safety lock is mechanically and automatically operated.

Various accessories have been omitted from the illustrations of the machine as not essential to the exemplification of the present invention, but it will be understood of course that these accessories will be used in the machines constructed according to the invention.

Having thus fully described my invention, what I claim as new and desire to secure by Letters Patent is—

1. The combination with a draw plate and actuating means therefor, of motive fluid actuated counterbalancing means for said plate, a normally inoperative mechanical lock for said plate, and a fluid pressure actuated device whereby the plate is locked when pressure is withdrawn from said device.

2. The combination with a draw plate and means for elevating said plate, of a pressure actuated device and a normally inoperative locking device for said plate whereby the locking plate becomes operative when pressure is withdrawn from said pressure actuated device.

3. The combination with a draw plate, a manual operating lever, rotary power transmitting mechanism and reciprocating power transmission mechanism for said plate, of motive fluid actuated counterbalancing means for said plate, a pressure actuated device, and a spring bolt carried by the rotary mechanism for locking said plate when pressure is withdrawn from said device.

4. The combination with a draw plate and manually operated means for reciprocating said plate, of a plurality of motive fluid pumps and connections from said pumps for counterbalancing the weight of the draw plate in its movements.

5. The combination with a machine frame having stationary guide members, of a draw plate having co-acting guide members, manually operated means for reciprocating said plate, a plurality of motive fluid pumps, and connections from said pumps for counterbalancing the weight of the draw plate.

6. The combination with a reciprocable draw plate, of a plurality of operating shafts and means for rocking said shafts, means for transmitting the movement of the shafts to reciprocal movement of the plate, bearings for said shafts, and means for adjusting said bearings.

7. The combination with a reciprocable draw plate, of an actuating shaft and means for turning said shaft, a pair of operating shafts and gears connecting the three shafts, cranks on said shafts and pitmen connecting said cranks and draw plate, bearings for said shafts, and means for adjusting said bearings.

RICHARD B. BROWNE.